May 3, 1955 — F. J. KENNEDY — 2,707,629
METHOD AND APPARATUS FOR HEATING METAL PARTS
Filed March 25, 1954 — 2 Sheets-Sheet 1
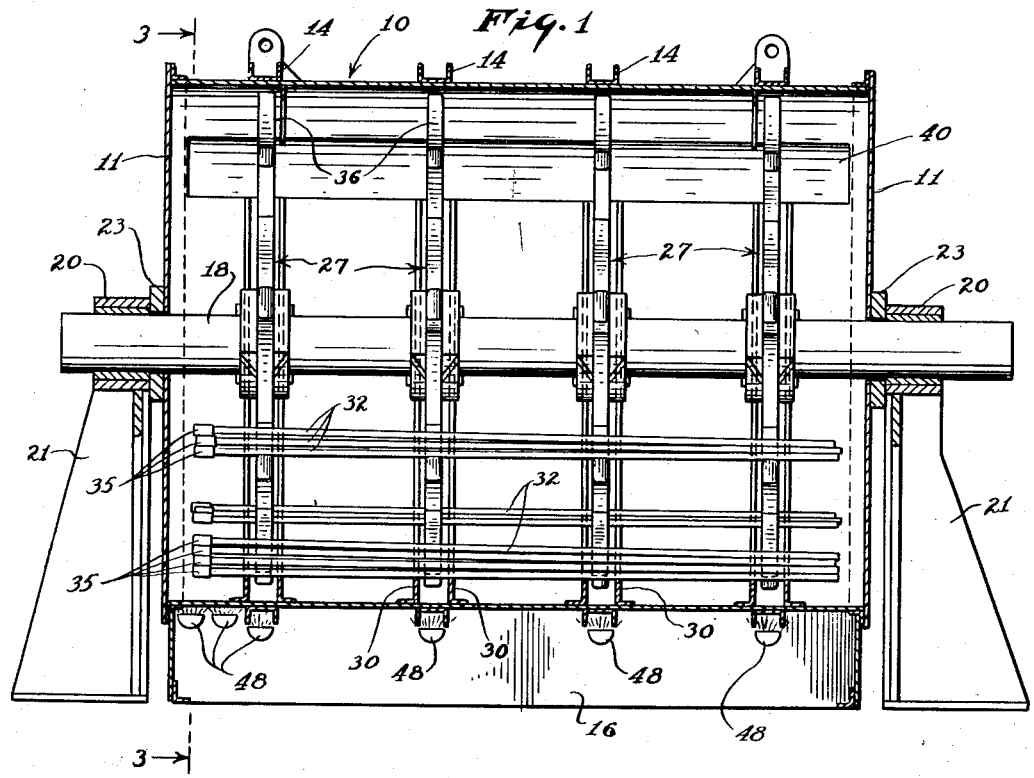
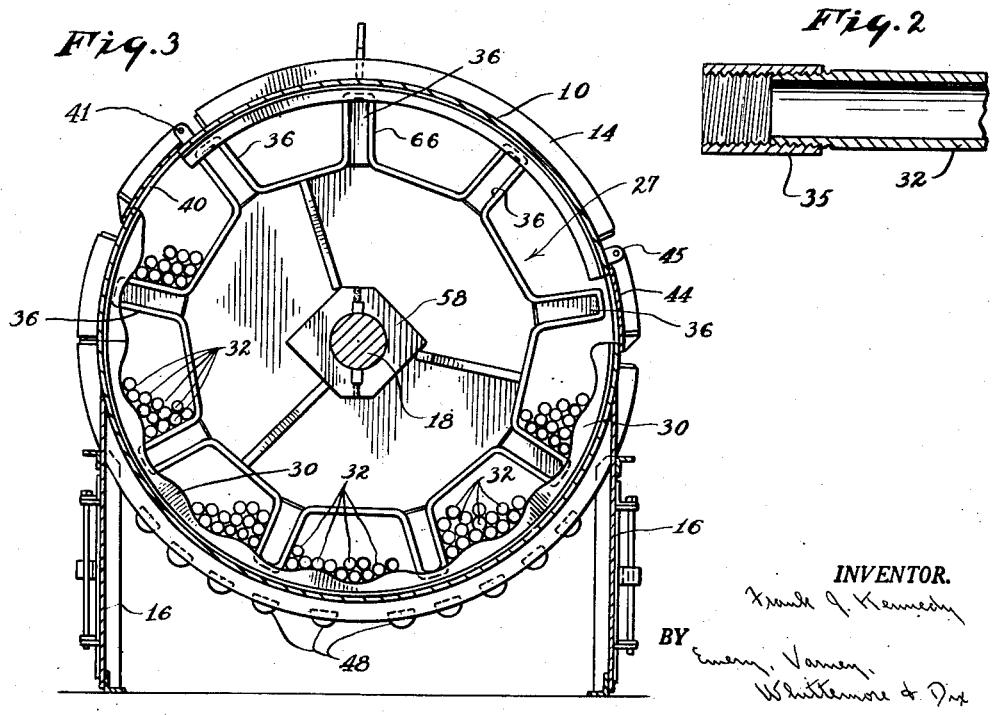
INVENTOR.
Frank J. Kennedy
BY Emery, Varney, Whittemore & Dix
ATTORNEYS May 3, 1955  F. J. KENNEDY  2,707,629
METHOD AND APPARATUS FOR HEATING METAL PARTS
Filed March 25, 1954  2 Sheets-Sheet 2

INVENTOR.
Frank J. Kennedy
BY Emery, Varney,
Whittemore & Dix
ATTORNEYS

United States Patent Office 2,707,629
Patented May 3, 1955

2,707,629

METHOD AND APPARATUS FOR HEATING METAL PARTS

Frank J. Kennedy, Mount Lebanon, Pa.

Application March 25, 1954, Serial No. 418,689

7 Claims. (Cl. 263—7)

This invention relates to methods and apparatus for heating metal work pieces, and more especially hollow work pieces that have substantially different wall thickness at different regions along their length. The invention is intended for the purpose of heating ferrous conduit to a predetermined, controlled temperature, as for sherardizing, but it can be used for heating any work piece, or group of work pieces, where it is desirable to increase the temperature more uniformly by compensating the differences in wall thickness at different regions lengthwise of the work piece.

When heating conduits, with a coupling on one end of each conduit, the thickness of the wall to be heated is much greater at the region where the coupling is screwed over the threaded end of the conduit. In order to have the temperature of the conduit rise substantially uniformly at the heavy wall thickness and at the regions of normal wall thickness, this invention puts more heat into the heavier section. The heat input is made uneven to obtain substantially even temperature increase.

It is an object of this invention to provide an improved method and apparatus for heating a work piece and controlling the temperature rise even though the section to be heated varies in thickness at different regions of its length. A more specific object is to provide an improved method and apparatus for heating conduits to the necessary temperature for sherardizing and for applying zinc to the parts to obtain the sherardizing coating.

Other objects, features and advantages of the invention will appear or be pointed out as the description proceeds.

In the drawings forming a part of this specification in which like reference characters indicate corresponding parts in all the views:

Figure 1 is a vertical, sectional view through a furnace embodying this invention;

Figure 2 is a greatly enlarged, sectional view through one of the conduits with a coupling which produces a substantial increase in the wall thickness of the workpiece at a region along the length of the workpiece;

Figure 3 is a sectional view taken on the line 3—3 of Figure 1;

Figure 4:
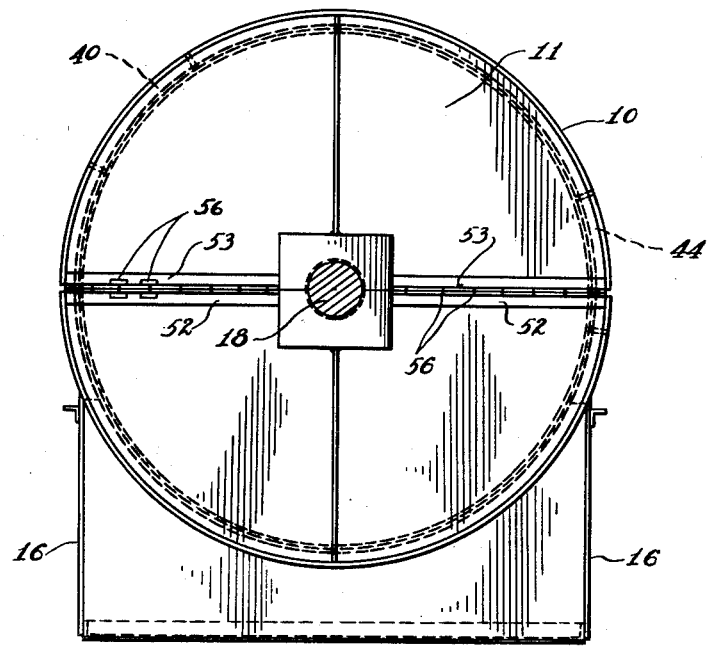
Figure 4 is an end view of the furnace shown in Fig. 1.

The furnace, shown in Figure 1, includes a cylindrical shell 10 closed by circular end walls 11. The shell has rings 14 at axially spaced regions along its length, these rings extending all the way around the shell 10 except for certain breaks in their continuity for a charging and discharging door on the furnace. The shell of the furnace is supported by side plates 16 attached near their upper ends to the sides of the channel rings 14.

A shaft 18 extends lengthwise through the furnace and is supported at its opposite ends by bearings 20 on pedestals 21. These bearing pedestals rest on the floor, or other underlying support, on which the lower edges of the side plates 16 rest. There are packing rings 23 around the shaft 18 at opposite ends of the furnace.

The shaft 18 has an end portion 25 extending beyond its adjacent bearing 20 for receiving a gear or other driving element by which rotary motion is imported to the shaft from a motor. Within the shell 10, there are spiders 27 keyed to the shaft 18 at a number of spaced stations lengthwise of the shaft 18. The axis of this shaft 18 is preferably on the longitudinal axis of the cylindrical shell 10.

Around the bottom wall of the shell 10, there are angles 30 which serve as work supports for holding a plurality of work pieces and more specifically ferrous metal conduits or pipes 32. These angles or work supports 30, support the conduits 32 at a number of regions spaced lengthwise of the conduits so as to prevent sagging of the conduits when hot. The shell 10, of the furnace, is slightly longer than the conduits 32 and each of the conduits has a coupling 35 screwed over the threaded ends of the conduits at the left-hand end of the furnace, shown in Figure 1.

The work supports 30 are preferably scalloped, as shown in Figure 3, so as to effect changes in distribution of various bunches of conduits that are passed through the furnace. This scalloped contour, of the work supports 30 is shown clearly in Figure 3. As the spiders 27 rotate as a unit with the shaft 18, the arms 36 of the spiders 27, which separate the conduits 32 into groups, cause the separate groups to move along the scalloped top edges of the work supports 30. This movement causes the conduits 32, which are in contact with the work supports, to roll on the work supports 30 and to impart their rotation to the conduits located above them.

If the number of conduits passing through the furnace is small, all of them can rest on the scalloped edges of the work supports 30. The spiders 27, therefore, constitute mechanism for rotating the work pieces about their own axes, and this is important for distributing the heating of the work pieces around their entire circumferences.

In addition to the rotation of the conduits or work pieces 32 about their own longitudinal axes, the spiders 27 also impart a limited rotation to the work pieces about the axis of the shaft 18. In order to be sure that no conduits can slip under the arms of the spiders, the arms 36 are made long enough to extend below the top edges of the work supports 30.

Each group of conduits 32 is initially placed in the furnace by opening a door 40 (Figure 3), which extends lengthwise of the furnace, and which is connected to the furnace by a hinge 41. When this door is opened, the conduits 32 can be rolled into the furnace and on to the spider arms which are immediately below the door opening. The spiders are angularly disposed on the shaft 18 so that all of the spider arms are in line with the corresponding arms of the other spiders. Thus the conduits 32, when charged through the door 40, rest on one of the arms of each of the spiders.

The spiders 27 rotate in a counterclockwise direction in Figure 3, and as they reach a position below the axis of the shaft 18, the conduits 32 slide along the spider arms until the group of conduits comes into contact with the work supports 30. Continued counterclockwise rotation of the spiders advances the successive groups of conduits along the scalloped supporting surfaces of the work supports 30 with resulting spreading and contracting of the groups as clearly shown in Figure 3.

On the side of the furnace opposite the charging door 40, there is a discharging door 44 connected to the furnace by a hinge 45. This discharging door is at a somewhat lower level than the charging door 40 so that the spider arms extend in a substantially horizontal direction at the time they reach the discharge door 44. Chutes can be provided immediately adjacent to the doors 40 and 44 for the conduits to slide along as they enter and leave the furnace. Conveyors are preferably provided at the ends of the chutes, for bringing new supplies of conduits to the chute adjacent to the charging door 40 and for taking the conduits away from the chute which is adjacent to the discharge door 44.

In order to heat the work pieces at they travel through the furnace, there are gas burners 48 at angularly spaced locations around the lower part of the circumference of the furnace shell 10. There are similar groups of burners 48 at axially spaced locations along the length of the furnace as shown in Figure 1. The burners 48 of each group are axially spaced around at least a portion of the circumference of the furnace shell 10 but there may be fewer burners 48 in the groups of burners under that part of the furnace beyond the couplings 35.

The heating apparatus of this invention is intended to raise the temperature of the conduits to a predetermined, controlled temperature suitable for sherardizing or any other operation where it is desirable to have a substantially uniform temperature throughout substantially the entire length of the work piece. With each work piece 32, having heavier wall thickness at the end on which the coupling 35 is threaded, the coupling end would rise in temperature more slowly than the rest of the work piece if the heat input were uniform throughout the entire length of the furnace. In order to have the temperature of the work pieces increase more uniformly, the furnace is constructed so as to apply more heat to the work pieces at the ends which have the thicker walls.

This differential heating is obtained by having a greater concentration of the burners 48 at the end of the furnace in which the coupling ends of the work pieces are located, as shown best in Figure 1. Some groups of burners are located under the rings 14, and this is advantageous because it applies heat at the regions where the work pieces are losing some heat by conduction into the arms of the spiders 27. The burners 48 heat the metal wall of the furnace, and heat is transferred to the work pieces in several different ways.

A relatively small amount of heat is conducted through the work piece supports 30 to the conduits that are in contact with the supports. A large amount of the heating, however, is by conduction through the air or gas within the furnace. The furnace atmosphere, heated by contact with the areas of the furnace wall above the various burners 48, rises around the work pieces and heats them by direct contact. Although the shell 10 and rings 14 of the furnace spread heat by conduction in different directions away from the areas which are directly heated by the burners 48, the areas above the burners are the most highly heated and constitute concentrations of heat at the various locations above the burners. These locations are spaced circumferentially around a portion of the furnace and are also spaced axially in the same way as the burners and groups of burners.

When the furnace is being used for sherardizing, there are substantial quantities of zinc dust in the furnace which reduces the amount of heat that can be transmitted by direct radiation from the concentrated heat areas of the furnace; but when the radiation from these locations of concentrated heat is not impaired by zinc dust, a substantial amount of the heating of the conduits is by radiant heat transmitted directly to the work pieces from these highly heated areas above the burners.

It will be evident that the left-hand end of the furnace, in Figure 1, transmits to the work piece more heat, by both radiation and conduction, because of the concentration of the burners 48 at that end of the furnace, and the resulting increased number of highly heated areas of the shell immediately above the burners. The burners 48 are preferably air-gas burners having internal combustion chambers and ceramic faces which are heated to incandescence by the products of combustion flowing from the interior chamber. Such burners, commonly referred to as "Selas" burners are well known in the furnace art and no further description of them is necessary for a complete understanding of this invention.

Figure 4 shows an end view of the furnace with the wall 11 made up of sections joined together by angles 52 and 53. Angles 52 are connected to the lower sections of the wall; and angles 53 are connected to the upper section of the wall. These angles 52 and 53 are connected together by fastening means 56, such as bolts or rivets. Similar angles 52 and 53 extend down the sides of the shells so that the upper half of the shell can be separated from the lower half when it is necessary to have access to the interior of the furnace for alterations or repairs.

Figure 5:
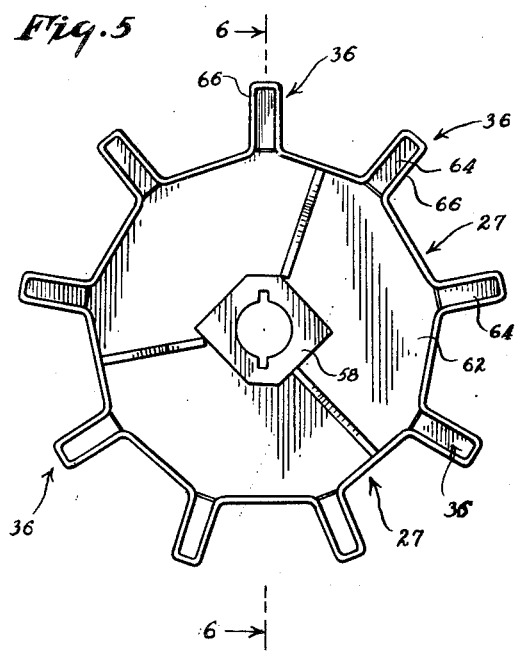
Figure 5 is an end view of one of the spiders by which the conduits are moved and rotates within the furnace.
Figure 6:
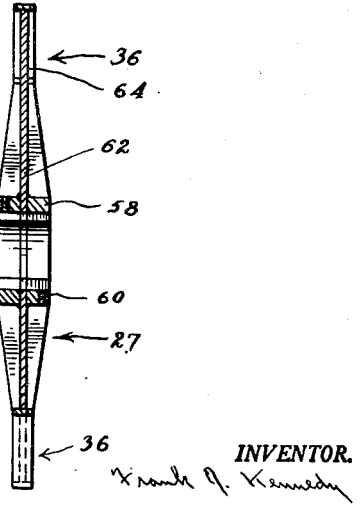
Figure 6 is a sectional view taken on the line 6—6 of Fig. 5.

Figures 5 and 6 show the construction of one of the spiders 27. The other spiders are of similar construction. There is a hub 58 at the center with openings 60 for set screws which lock the spiders in position on the shaft. Beyond the hub 58, there is a plate 62 which extends to the inner ends of the spider arms 36. Each of these arms includes a web 64 which is connected to the plate 62 and may be made as a part of the plate if desired. Each arm 36 has bars 66 secured to the perimeter of the web 64 except where the web joins the plate 62. These bars increase the width of the spider arms and facilitate the supporting of the conduits in the furnace.

The preferred embodiment of the invention has been illustrated and described, but some features can be used in different combinations, and various modifications can be made without departing from the invention as defined in the claims.

What is claimed is:

1. The method of heating a work piece in a furnace, the work piece being of different transverse thickness at different regions along its length, which method comprises continuously heating localized areas of the inside face of the furnace at longitudinally spaced regions along the length of the furnace, and at circumferentially spaced locations at at least one of said longitudinally spaced regions to produce hot areas that are substantially hotter than the atmosphere of the furnace and of substantially higher temperature than the other parts of the inside face of the furnace to provide concentrated areas of high heat radiation and providing more of said areas of high heat radiation at at least one of said longitudinally spaced regions than at others of said regions, locating the work piece axially in the furnace to bring its region of different transverse thickness to the part of the length of the furnace having more of said areas of high heat radiation, and proportioning the heating to compensate the differences in the transverse thickness of the work piece by producing substantially equal temperature rises.

2. The method described in claim 1 throughout and in which the work piece is rotated about its longitudinal axis while being heated to distribute the heating uniformly around the circumference of the work piece.

3. The method of heating the interior of a furnace in which there is a work piece disposed with its longitudinal axis extending in the same directions as the longitudinal axis of the furnace and with the work piece of different transverse thickness at different sections along its length, which method comprises heating the atmosphere of the furnace at longitudinally spaced stations along the length of the furnace and at localized regions that are angularly spaced around the axis of the furnace, heating the furnace differentially by adding more heat at some stations than at others and applying at least a portion of the additional heat at a station corresponding to the longitudinal location of increased transverse thickness of the work piece and by strongly heating localized areas of the furnace wall at angularly spaced locations around the axis of the furnace at that station, and coordinating the additional heat with the difference in transverse thickness of the work piece for producing substantially equal temperature rises, and maintaining the heating of said localized areas of the furnace wall while the work piece is being rotated about its longitudinal axis to absorb heat from the furnace substantially uniformly about the circumference of the work piece.

4. Apparatus for heating a plurality of work pieces of different transverse thickness at different regions along their lengths, simultaneously, including, in combination a non-rotatable cylindrical furnace, a plurality of gas burners for heating the furnace with groups of said burners at different stations spaced from one another axially along the furnace, the burners at at least some of the stations being spaced from one another angularly around the axis of the furnace for at least a part of the circumference of the furnace and there being more burners at at least one station than at others of said stations so that the furnace is more strongly heated at at least one of said stations than at others, means for supporting a plurality of work pieces in the furnace with the length of the work pieces extending substantially parallel to the axis of the furnace, and means for rotating the various work pieces simultaneously while heating them in the furnace, the axis of the furnace being substantially horizontal and the means for supporting the work piece comprising rings located within the furnace and secured to the furnace and fixed relative to the rotating means and spaced axially from one another and having scalloped outlines in the direction of their circumferential extent so as to provide hill-and-dale supporting surfaces that cause the work pieces to move radially within the furnace as they are advanced by the means for rotating them.

5. A generally cylindrical furnace for raising the temperature substantially uniformly in a work piece that is of different thickness at different regions along its length, said furnace having a side wall with an inside face enclosing a heating chamber, heating means for the furnace including groups of burners for heating the atmosphere within the furnace, the groups of burners being distributed among longitudinally spaced stations along the furnace and the burners of each group being circumferentially spaced around the axis of the furnace, the burners being in position to provide hot spots on the furnace wall at the longitudinally and circumferentially spaced locations of said burners, the hot spots being of substantially higher temperature than the atmosphere of the furnace there being more burners in the group at one station than at others of the stations, and means for supporting the work piece in the furnace at a predetermined spacing from said hot spots around and along the furnace wall.

6. Apparatus for raising the temperature substantially uniformly and more quickly in a work piece that is of different transverse thickness at different regions along its length, including a furnace having a side wall with an inside face enclosing a heating chamber, means for supporting a work piece in the heating chamber with the longitudinal axis of the work piece extending lengthwise of the heating chamber, means for rotating the work piece about its longitudinal axis, and heating means for heating the interior of the furnace and the work piece located therein, the heating means being distributed among longitudinally spaced stations along the length of the furnace and the heating means at at least one of the stations extending circumferentially at least part way around the longitudinal axis of the furnace, said heating means being of high intensity and located in position to produce highly heated areas of concentrated radiation on the furnace wall at the spaced locations of said heating means, the highly heated areas being of substantially higher temperature than the atmosphere of the furnace, and there being more heating means at one of said stations than at others of said stations whereby the furnace wall is highly heated over a greater area of concentrated radiation at the station having more heating means, and the work piece being supported in the furnace in such a position that its region of different thickness is located lengthwise of the furnace at the station having more heating means.

7. The apparatus described in claim 6 and in which the heating means are air-gas burners having internal combustion chambers and ceramic faces which are heated to incandescence by the products of combustion flowing from the interior chamber.

References Cited in the file of this patent

UNITED STATES PATENTS

| | | |
|---|---|---|
| 1,149,917 | Jamison et al. | Aug. 10, 1915 |
| 1,169,529 | Collins et al. | Jan. 25, 1916 |
| 1,266,750 | Adams | May 21, 1918 |
| 1,319,741 | Wikstrom | Oct. 28, 1918 |
| 1,605,535 | Foisy | Nov. 2, 1926 |
| 2,013,185 | Powell | Sept. 3, 1935 |
| 2,282,942 | Crowe | May 12, 1942 |
| 2,348,673 | Degner | May 9, 1944 |
| 2,355,459 | Miskella | Aug. 8, 1944 |
| 2,625,387 | Hess | Jan. 13, 1953 |
| 2,656,170 | Mann | Oct. 20, 1953 |

FOREIGN PATENTS

| | | |
|---|---|---|
| 303,830 | Great Britain | May 9, 1944 |